Figure 1A:
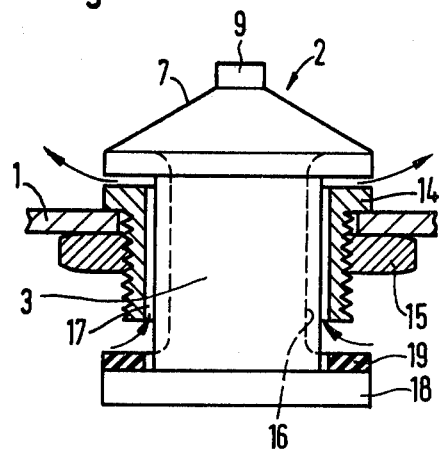
Figure 1B:
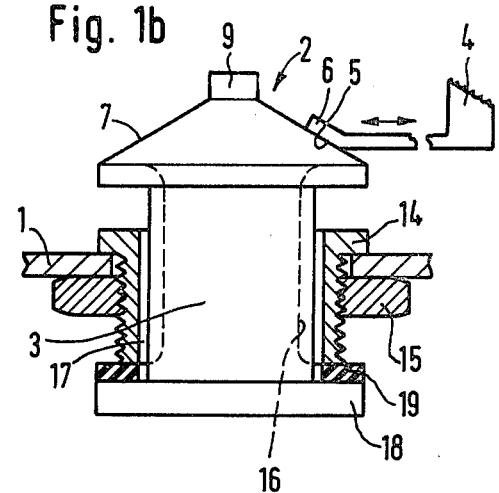

United States Patent [19]

Horn

[11] 4,424,915
[45] Jan. 10, 1984

[54] LID-LATCHING AND PRESSURE RELIEVING DEVICE FOR A STEAM PRESSURE COOKER

[75] Inventor: Walter Horn, Idar-Oberstein, Fed. Rep. of Germany

[73] Assignee: Fissler Gesellschaft mit beschrankter Haftung, Idar-Oberstein, Fed. Rep. of Germany

[21] Appl. No.: 361,523

[22] Filed: Mar. 23, 1982

[30] Foreign Application Priority Data

Apr. 1, 1981 [DE] Fed. Rep. of Germany ....... 3112993

[51] Int. Cl.³ .............................................. B65D 45/00
[52] U.S. Cl. ..................................... 220/316; 220/206
[58] Field of Search ................ 220/206, 303, 316, 293

[56] References Cited

U.S. PATENT DOCUMENTS 3,973,694  8/1976  Tess ........................................ 220/206
4,024,982  5/1977  Schultz ............................. 220/316 X
4,103,801  8/1978  Walker ............................. 220/316 X
4,251,007  2/1981  Behnisch ............................... 220/316
4,299,331 11/1981  Bertola ................................. 220/316

Primary Examiner—George T. Hall
Attorney, Agent, or Firm—Goodman & Teitelbaum

[57] ABSTRACT

A lid-latching and pressure-relieving device for a steam pressure cooker, the device enabling a lid (1) to be latched on to a saucepan of the cooker and having a valve (2) to relieve pressure in the cooker. The pressure-relief and lid-latching functions of the device are so coupled that the valve (2) is operatively connected to an actuating member (4) and the valve being responsive to pressure in the cooker when the lid is latched on the saucepan and being movable by the actuating member from a first position, in which the lid is latched on the saucepan and pressure exists in the cooker to enable cooking under pressure to take place, to a second position in which pressure in the cooker can be relieved through the valve without unlatching the lid, and to a third position in which the lid can be unlatched by the actuating member, the third position only being attainable upon discharge of the pressure in the cooker.

21 Claims, 9 Drawing Figures

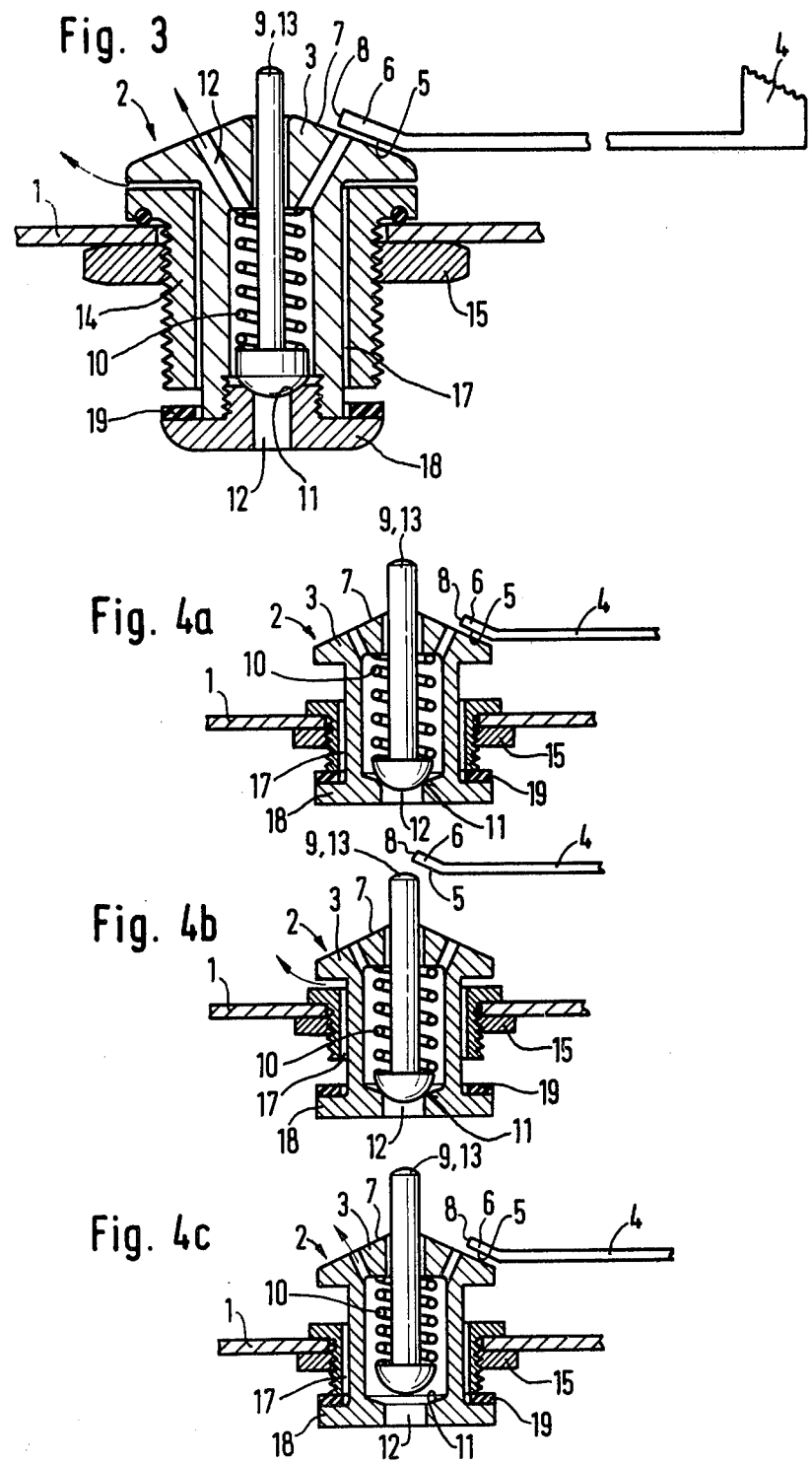

LID-LATCHING AND PRESSURE RELIEVING DEVICE FOR A STEAM PRESSURE COOKER

This invention relates to a lid-latching and pressure-relieving device for a steam pressure saucepan ("pressure-cooker").

It is known for the pressure cooker saucepan and its lid to be connected in a locked position by means of bayonet segments, with pressure-relief and lid-latching being so functionally coupled that a valve actuable by and responding to the pressure in the pan is connected by way of, for example, rigid mechanical elements to an actuating member for unlatching the lid. The valve has a valve member which is, for example, movable axially of itself and which is displaceable between a valve-closed position and a pressure-relief position. An actuating member in the form of a slide acts in one position on the valve member to hold the valve open to release pressure in the cooker by means of an inclined plane in the form of a tongue. The slide can restrict or free the path of movement available to the valve member in dependence on the position of the slide, possibly by co-action with a correspondingly inclined plane of the valve member, and the slide simultaneously actuating a lid-latching cam which can be controlled by the saucepan bayonet segments and which locks the lid in a closed position in relation to the saucepan so that foods can be cooked under pressure.

Such a lid-latching and pressure-relieving device is known, for example, from German Auslegeschrift No. 2705712 in which it is possible for the lid and saucepan to be turned manually relatively to one another immediately after actuating the slide, so that the bayonet segments associated with one another come out of latching engagement. The possibility thus exists of steam being able to emerge at the peripheral region of the lid on account of the still existing pressure inside the saucepan and this is undesirable because of possible danger of the hand of the person handling the cooker being scalded.

According to the present invention, there is provided a lid-latching and pressure-relieving device for a steam pressure cooker, the device enabling the lid to be latched onto a saucepan of the cooker and having a valve to relieve pressure in the cooker, the pressure-relief and lid-latching functions of the device being so coupled that said valve is operatively connected to an actuating member for unlatching the lid, the valve being responsive to pressure in the cooker when the lid is latched on the saucepan and being movable by said actuating member from a first position, in which the lid is latched on said saucepan and pressure exists in the cooker to enable cooking under pressure to take place, to a second position in which pressure in the cooker can be released through said valve without unlatching the lid, and to a third position in which the lid can be unlatched by said actuating member, said third position only being attainable after discharge of the pressure in the cooker.

Figure 1C:
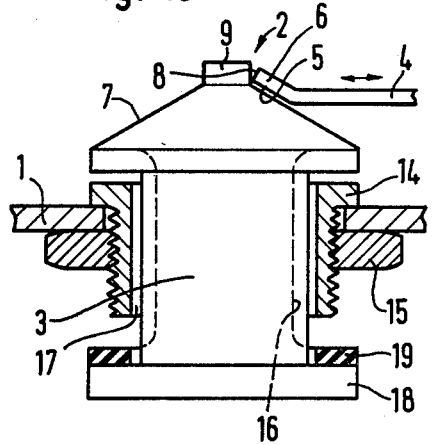
Figure 1D:
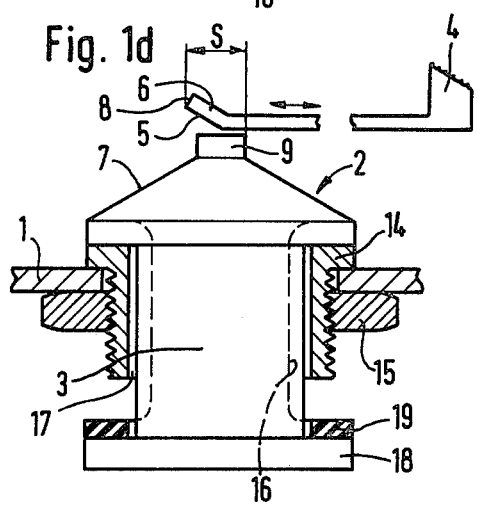
Figure 2:
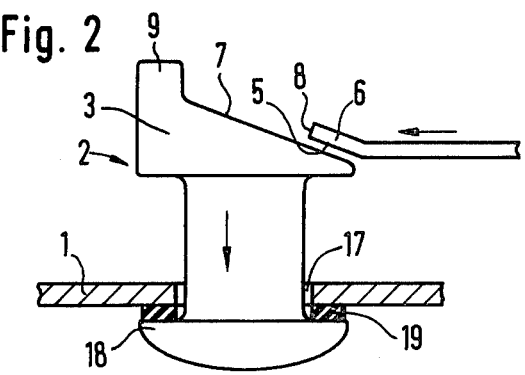

For a better understanding of the invention and to show how the same may be carried into effect, reference will now be made, by way of example, to the accompanying drawings, in which:

FIGS. 1a to 1d each show a diagrammatic sectional side view of a lid-latching and pressure-relieving device for a pressure cooker, each figure showing a different position of a valve member thereof, FIG. 2 is a view similar to FIG. 1a and shows a modification of the valve member, FIG. 3 is a view similar to FIG. 1a but shows a further modification, and FIGS. 4a to 4c each show the device shown in FIG. 3 and illustrate different positions of the valve member or of a valve pin of the device, respectively.

Referring firstly to FIG. 1a, a pressure cooker lid 1 is provided with a valve 2 which consists of a sleeve-like valve housing 14 which extends through an opening in the lid 1 and which is held by means of an upper annular shoulder formed thereon and a co-acting member 15 screwed thereon from below in a sealing manner on the lid 1. Movable axially in the valve housing 14 is a valve member 3 which in its basic form is cylindrical but with an upper supporting shoulder. For the passage of air or steam, the valve member 3 has either grooves 16 which are distributed over its circumference (FIGS. 1a to 1d) and/or a sufficient clearance or gap 17 between the valve housing 14 and the valve member 3 (FIGS. 2 and 3).

The manner in which such a valve functions is known. If the steam pressure cooker is placed on a cooking ring and is heated to bring the food to the boil, then it is initially the air which is inside the cooker which is heated. In this condition, as indicated by arrows in FIG. 1a, the valve member 3 is only slightly lifted from its initial opening position to accommodate for the increase in volume via the groove 16 or the clearance or gap 17.

With further heating, steam is formed, which is accordingly able to emerge from the valve 2, there being a sufficient flow through the groove 16 or the gap 17 to lift the valve member 3 so that it reaches a closure position (FIG. 1b) in which it bears, by means of a bottom sealing shoulder 18, against a corresponding co-acting surface of the valve housing 14 to prevent further escape of steam so that food in the cooker can be cooked under pressure. The shoulder 18 may be provided with a sealing surface or ring 19, more especially when the valve member 3 does not in itself already consist of a sealing material, for example, a synthetic plastics material.

Thus, with such a valve 2, the valve member 3 only reaches its closed position (FIG. 1b) when the air previously present inside the cooker is to a large extent driven off, which is desirable for retaining in the cooker the aroma of the food being cooked, and a sufficiently high pressure has built up inside the cooker.

With the present device, it is possible for an actuating member in the form of a slide 4, by which it is simultaneously possible to actuate a lid-latching mechanism, for example, bayonet segments of a lid-latching cam (not shown) on the periphery of the lid, which locks the lid relatively to the saucepan in the closed state thereof and enables twisting of the lid in relation to the saucepan only to such an extent, by swivelling or displacement of the slide 4 in the direction towards the valve axis, to force the valve member 3 downwardly to disengage the sealing shoulder 18 from the co-acting surface of the valve housing 14 to release the steam pressure through the valve 2 without allowing steam to escape from the periphery of the lid. To achieve this, the slide 4 is provided with a tongue 6 having an inclined plane 5 which runs on a correspondingly inclined plane 7 of the valve member 3. As shown in FIG. 1c, a forward edge 8 of the tongue 6 abuts against a boss or stop 9 on the valve member 3 when the slide 4 has been displaced towards the valve axis. The stop 9 can be moulded on the valve member 3. In this condition of the device, the lid-latching mechanism is still not actuated so that the lid 1 cannot be released. To this extent, there is therefore an idle travel of the slide 4 with respect to the actuation of the lid-latching mechanism and so it is now possible for the internal pressure and steam in the cooker to be completely dissipated through the grooves 16 or the gap 17 of the valve member 3. When the internal excess pressure has been completely dissipated, the valve member 3 falls back into its lower initial position shown in FIG. 1d.

The height position and the horizontal displacement of the tongue 6, the vertical travel of the valve member 3 and the axial and height position of the stop 9 are so matched to one another that, as illustrated in FIG. 1c, the tongue 6, because of the co-action of the inclined planes 5 and 7, partly displaces the valve member 3 downwardly into its pressure-releasing position against the pressure of the discharging steam. However, the complete lowering of the valve member 3 as shown in FIG. 1c can only take place when the pressure inside the cooker is completely dissipated and this movement of the valve member 3 enables the slide 4 with the tongue 6 to be displaced further inwardly towards the valve axis over an additional path of displacement S, since now the stop 9 is situated beneath the path of displacement S of the tongue 6. It is only over this path of displacement S that the lid-latching mechanism on the periphery of the lid can be actuated to unlatch the lid 1 so that only then can the lid 1 be twisted relatively to the saucepan to release it.

FIG. 2 shows a different type of valve member 3. In this case, the stop 9 is not central, but is arranged on that side of the valve member 3 which is furthest from the tongue 6. By this means, a larger possible path of displacement of the tongue 6 and valve member 3 is obtained before the lid-latching mechanism can be actuated to allow an unlocking action. This may be useful, more especially when it is possible with the axial displacement of the valve member 3 to control the cross-section of the grooves 16 or of the gap 17 which is available for the releasing of the steam pressure. It is in fact possible in this way, for example, also to actuate the slide 4 during cooking, that is to say without the intention of removing the lid 1 from the saucepan, so as to permit an intermediate regulated release of steam from inside the cooker.

The construction shown in FIG. 2 is effective without a separate valve housing 14. The valve member 3, which can for example be assembled from an upper section and a lower section which are screwed together, can be moved axially directly within an opening of the lid 1. The upper head section of the valve member 3 has, as with the form shown in FIGS. 1a to 1d, an upper cross-section which extends beyond the cross-section of the lid opening. The enlarged valve shoulder 18 at the bottom is likewise provided with a sealing liner or ring 19.

The form of device shown in FIGS. 3 and 4a to 4c includes a pressure-release valve incorporated in the valve 2. This form differs from the forms shown in FIGS. 1a to 1d and 2 by the fact that a separate valve pin 13 is mounted in the valve member 3. A bottom head of the valve pin 13 is urged by a compression spring 10, which is supported on an internal surface of the valve member 3, against a valve seat 11 which is likewise formed on the valve member 3. By this means, a pressure-release duct 12 is closed, which duct extends from the bottom of the valve member 3 and centrally through it, through the chamber accommodating the compression spring 10 and the head of the valve pin 13 and opens into the atmosphere by way of inclined duct sections at the top of the valve member 3.

The upper end of the valve pin 13 extends through and projects from a central guide opening in the valve member 3. As previously, the valve member 3 has on its upper surface an inclined plane 7 which co-acts with the inclined plane 5 of the tongue 6. In this form, however, the valve pin 13 constitutes the necessary boss or stop 9 for the front edge 8 of the tongue 6. FIG. 4a represents the boiling or cooking position of the valve member 3 (corresponding to FIG. 1b). The valve member 3 is disposed with its bottom sealing shoulder 18 on the corresponding co-acting surface of the valve housing 14 and so the valve 2 is closed. If it is desired to open the pressure cooker, then first of all the tongue 6 is pushed towards the axis of the valve member by means of the slide 4 until the front edge 8 of the tongue 6 abuts against the upper end of the valve pin 13 acting as the stop 9. This position is not shown; it corresponds to the position shown in FIG. 1c. Until in this position, any actuating of the lid-latching mechanism in the sense of allowing turning of the lid 1 relatively to the saucepan has still not occurred. It is now possible, since the valve member 3 has already been depressed to lift it from its sealing seat, for the necessary dissipation of internal pressure to occur. It is only when the valve member 3 has been allowed to be lowered into its lowermost position by the internal drop in pressure, as shown in FIG. 4b, that the further part of displacement of the tongue 6 is facilitated by the valve pin 13 lying at a correspondingly lower position. It is now possible to effect the unlocking of the bayonet segments of the pressure cooker.

FIG. 4c illustrates the cooking and pressure-release valve in its functional position at the time of dissipating an impermissible and possibly dangerous excess pressure. Because of the excess pressure, the valve pin 13 is lifted from its seating 11 against the pressure of the spring 10. The pressure is now able to be dissipated through the pressure-release duct 12, which is now open, until the compression spring 10 has once again forced the valve pin 13 against the valve seat 11.

In this case, the valve pin 13 therefore assumes two functions, namely, of safeguarding against excess pressure in order to avoid an excessive pressure inside the cooker and the function of the stop cam or boss for preventing any emergence of steam at the rim of the lid when the cooker is opened.

The devices described above refer to the valve member 3 and the tongue 6 of the slide 4 forming co-acting inclined planes. However, it will be appreciated that either only the valve member 3 or only the tongue 6 form a corresponding inclined plane, co-operating for example with one edge of the respective other element. All that is important as regards co-action between the valve member 3 and tongue 6 is that the horizontal displacement of the tongue 6 is converted into a vertical (axial) movement of the valve member 3.

I claim:

1. A lid-latching and pressure-relieving device for a steam pressure cooker, the device enabling the lid to be latched onto a saucepan of the cooker and having a valve to relieve pressure in the cooker, the pressure-relief and lid-latching functions of the device being so coupled that said valve is operatively connected to an actuating member for unlatching the lid, the valve being responsive to pressure in the cooker when the lid is latched on the saucepan and being movable by said actuating member from a first position, in which the lid is latched on said saucepan and pressure exists in the cooker to enable cooking under pressure to take place, to a second position in which pressure in the cooker can be released through said valve without unlatching the lid, and to a third position in which the lid can be unlatched by said actuating member, said third position only being attainable after discharge of the pressure in the cooker.

2. A device as claimed in claim 1, wherein said valve has a valve member which carries a stop and wherein said actuating member is in the form of a slide, said valve member and said slide co-operating with one another such that, when said valve is in said second position, said stop is positioned so that a tongue of said slide is prevented by said stop from being moved into a position where unlatching of the lid can take place.

3. A device as claimed in claim 2, wherein said valve member and said tongue have co-operating surfaces whereby, when said valve is in said first position, movement of said tongue towards said stop moves said valve member to move said valve from said first position to said second position.

4. A device as claimed in claim 3, wherein at least one of said co-operating surfaces is inclined to facilitate movement of said valve from said first position to said second position.

5. A device as claimed in claims 2, 3 or 4, wherein, when said valve is in said third position, said stop is moved clear of said tongue so that said actuating member can be moved to release the lid.

6. A device as claimed in claims 2, 3, or 4, wherein said valve member is arranged to move axially of itself between said first, second and third positions.

7. A device as claimed in claims 2, 3 or 4 wherein said valve incorporates means to release undesirable excess pressure from the cooker.

8. A device as claimed in claim 7, wherein said means comprises a valve pin urged by a spring against a seating in said valve member, said valve pin being able to be lifted from said seating by excess pressure inside the cooker, thereby to open a pressure-release duct leading to the atmosphere.

9. A device as claimed in claim 8, wherein an upper end of said valve pin protrudes from said valve member to form said stop.

10. A steam pressure cooker having a lid-latching and pressure-relieving device, the device enabling the lid to be latched onto a saucepan of the cooker and having a valve to relieve pressure in the cooker, the pressure-relief and lid-latching functions of the device being so coupled that said valve is operatively connected to an actuating member for unlatching the lid, the valve being responsive to pressure in the cooker when the lid is latched on the saucepan and being movable by said actuating member from a first position, in which the lid is latched on said saucepan and pressure exists in the cooker to enable cooking under pressure to take place, to a second position in which pressure in the cooker can be released through said valve without unlatching the lid, and to a third position in which the lid can be unlatched by said actuating member, said third position only being attainable after discharge of the pressure in the cooker.

11. A steam pressure cooker as claimed in claim 10, wherein said device is provided on the lid of the pressure cooker.

12. A steam pressure cooker as claimed in claim 10 or 11, wherein the lid is able to be latched on the saucepan of the cooker by means of latching means including bayonet segments which are able to lock the lid in a closed position in relation to the saucepan.

13. A device as claimed in claim 5, wherein said valve member is arranged to move axially of itself between said first, second and third positions.

14. A device as claimed in claim 1, wherein said valve incorporates means to release undesirable excess pressure from the cooker.

15. A device as claimed in claim 14, wherein said means comprises a valve pin urged by a spring against a seating in a valve member, said valve pin being able to be lifted from said seating by excess pressure inside the cooker, thereby to open a pressure-release duct leading to the atmosphere.

16. A device as claimed in claim 5, wherein said valve incorporates means to release undesirable excess pressure from the cooker.

17. A device as claimed in claim 16, wherein said means comprises a valve pin urged by a spring against a seating in said valve member, said valve pin being able to be lifted from said seating by excess pressure inside the cooker, thereby to open a pressure-release duct leading to the atmosphere.

18. A device as claimed in claim 17, wherein an upper end of said valve pin protrudes from said valve member to form said stop.

19. A device as claimed in claim 6, wherein said valve incorporates means to release undesirable excess pressure from the cooker.

20. A device as claimed in claim 19, wherein said means comprises a valve pin urged by a spring against a seating in said valve member, said valve pin being able to be lifted from said seating by excess pressure inside the cooker, thereby to open a pressure-release duct leading to the atmosphere.

21. A device as claimed in claim 20, wherein an upper end of said valve pin protrudes from said valve member to form said stop.

* * * * *